US006417636B2

(12) United States Patent
Takagi

(10) Patent No.: US 6,417,636 B2
(45) Date of Patent: Jul. 9, 2002

(54) POWER WINDOW DEVICE

(75) Inventor: Nobutomo Takagi, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/813,842

(22) Filed: Mar. 22, 2001

(30) Foreign Application Priority Data

Mar. 24, 2000 (JP) ....................................... 2000-088578

(51) Int. Cl.[7] .................................................. H02P 7/00

(52) U.S. Cl. ....................... 318/445; 318/280; 318/291; 361/139; 361/166; 361/167; 361/191; 307/10.1; 307/112; 307/122

(58) Field of Search ................................ 318/280, 291, 318/445; 361/139, 166, 167, 191; 307/10.1

(56) References Cited

U.S. PATENT DOCUMENTS

| | | | | | |
|---|---|---|---|---|---|
| 4,134,051 | A | * | 1/1979 | Pelchat et al. | 318/282 |
| 5,773,942 | A | * | 6/1998 | Takahara et al. | 318/280 |
| 5,925,997 | A | | 7/1999 | Yamaoka | 318/483 |
| 5,994,797 | A | | 11/1999 | Yamaoka | 307/125 |
| 6,072,290 | A | * | 6/2000 | Takagi et al. | 318/283 |
| 6,081,085 | A | | 6/2000 | Ohashi et al. | 318/283 |
| 6,111,373 | A | * | 8/2000 | Ohashi | 318/265 |
| 6,246,564 | B1 | * | 6/2001 | Sugiura et al. | 307/10.1 |
| 6,281,647 | B1 | * | 8/2001 | Sasaki | 318/264 |

FOREIGN PATENT DOCUMENTS

| | | |
|---|---|---|
| EP | 0921256 A1 | 6/1999 |
| GB | 2333407 A | 7/1999 |
| JP | 11-93518 | 4/1999 |
| WO | WO00/37761 | 6/2000 |

* cited by examiner

*Primary Examiner*—Robert E. Nappi
*Assistant Examiner*—Rita Leykin
(74) *Attorney, Agent, or Firm*—Law Offices of David G. Posz

(57) ABSTRACT

In a power window device, a DOWN switch has first and second switches in a power window circuit located in a door for a window of a passenger's seat. A normally-closed contact of the first switch and a remote UP terminal of the power window circuit to which an UP signal is applied from a power window circuit provided near the driver's seat are connected. A normally-closed contact of the second switch and a remote DOWN terminal of the power window circuit to which a DOWN signal is applied from the power window circuit are connected. When the DOWN switch is manually operated, a signal supply line to which the UP signal and the DOWN signal are applied and a power supply line to which a power source is connected are electrically disconnected. As a result, the power window device is operable even when the signal supply line is grounded due to submerging in water.

11 Claims, 1 Drawing Sheet

FIGURE
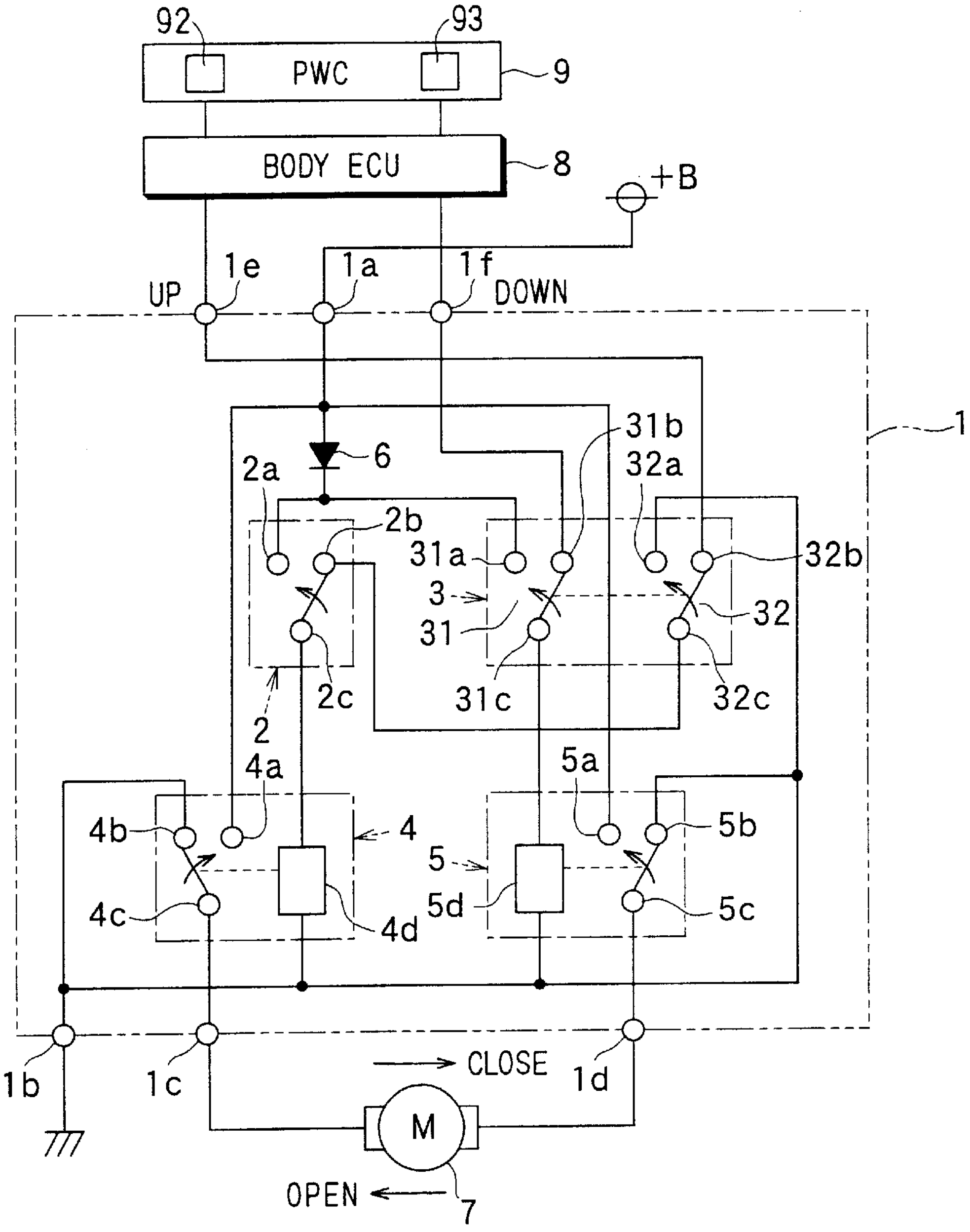

POWER WINDOW DEVICE

CROSS REFERENCE TO RELATED APPLICATION

This application is based on and incorporates herein by reference Japanese patent application No. 2000-88578 filed Mar. 24, 2000.

BACKGROUND OF THE INVENTION

This invention relates to a power window device capable of opening a door window of a car by means of a window opening switch in case a car is submerged in water.

A conventional power window device for a car is provided with power window circuits for doors of a driver's seat, assistant driver's seat and rear seats. Each power window circuit arranged within the door for the assistant driver's seat or the rear seats (passenger seats) is so constructed that the window is closed (raised) or opened (lowered) when a window regulating (opening and closing) switch located in the vicinity of each of these seats is manually operated. Further, the power window circuit provided in the door of the driver's seat is so constructed that, when its window regulating switch is operated, a signal from the power window circuit located in the door for the driver's seat is inputted to the power window circuit for another door of a passenger's seat through an electronic control unit (ECU). As a result, the windows for the passenger's seats are remotely regulated from the driver's seat. If the car is submerged in water, it is likely that the ECU will malfunction, failing to properly supply the signal to the power window circuit for the passenger's seat.

U.S. Pat. No. 6,072,290 (JP-A No. 11-166354) teaches a power window device which can open the window even in case of submersion of the car in water. This device is designed on an the assumption that each power window circuit is independent from other power window circuits so that a window of a passenger's door can be regulated by only the corresponding power window circuit. As a result, the windows for the passenger's seats cannot be remotely regulated from the driver's seat.

SUMMARY OF THE INVENTION

It is therefore an object of this invention to provide a power window device capable of regulating door windows for passenger's seats even when a car is submerged in water.

According to the present invention, a power window device has a power window circuit including an UP switch and a DOWN switch for closing and opening a door window of a passenger's seat other than a driver's seat. Another power window circuit is provided as an external circuit arranged outside of the power window circuit for supplying to the power window circuit an UP signal and a DOWN signal for remotely regulating closing and opening of the window. A signal supply line for supplying the UP and DOWN signals from the external circuit the power window circuit. When the DOWN switch of the power window circuit is turned on, the signal supply line and a power supply line to the motor are electrically disconnected to thereby open the window.

BRIEF DESCRIPTION OF THE DRAWINGS

The above and other objects, features and advantages of the present invention will become more apparent from the following detailed description made with reference to the accompanying drawings. In the drawings:

The single FIGURE shows an electric circuit diagram of a power window device according to an embodiment of the present invention.

DETAILED DESCRIPTION OF THE PREFERRED EMBODIMENT

In the FIGURE, only one power window circuit 1 is shown. The power window circuit 1 is located in a door for one of passenger's seats, for instance, an assistant driver's seat.

The power window circuit 1 has a window closing (UP) switch 2 and a window opening (DOWN) switch 3 of a double-throw type, and first and second relays 4 and 5 which are controlled by manual on-off operation of the UP switch 2 and the DOWN switch 3. These components are connected to external circuit through terminals 1*a* to 1*f*.

The UP switch 2 and the DOWN switch 3 are located in the door near the passenger's seat to be manually operated by a passenger. The DOWN switch 3 has a first switch 31 and a second switch 32 of a double-throw type. The first switch 31 and the second switch 32 are mutually interconnected and operated. The double-throw switch has one movable contact and a couple of stationary contacts. In this embodiment, of the stationary contacts of the switches 2 and 3 and relays 4 and 5, the contacts which are disconnected from movable contacts during normal operation (OFF position) are defined as normally-open contacts, and the contacts which are connected with the movable contacts during normal operation are defined as normally-closed contacts.

A power source terminal 1*a* of the power window circuit 1 is connected to a power source supply line which is connected to a power source +B. A normally-open contact 2*a* of the UP switch 2 and a normally-open contact 31*a* of the first switch 31 are connected to the power source terminal 1*a* through a surge-protective diode 6. A normally-open contact 4*a* of the first relay 4 and a normally-open contact 5*a* of the second relay 5 are also connected to the power source terminal 1*a*.

Furthermore, a normally-closed contact 2*b* of the UP switch 2 and a movable contact 32*c* of the second switch 32 of the DOWN switch 3 are connected to each other. A normally-open contact 32*a* of the second switch 32 is connected to a normally-closed contact 4*b* of the first relay 4 and a normally-closed contact 5*b* of the second relay 5, and is connected to a ground terminal 1*b*. The normally-closed contacts 4*b* and 5*b* of the first and second relays 4 and 5 are also connected to the ground terminal 1*b*.

A movable contact 4*c* of the first relay 4 is connected one end of a door window driving motor 7 via a terminal 1*c*. A movable contact 5*c* of the second relay 5 is connected to the other end of the motor 7 via a terminal 1*d*. A movable contact 2*c* of the UP switch 2 is connected to the ground terminal 1*b* via a driving coil 4*d* of the first relay 4, and a movable contact 31*c* of the first switch 31 of the DOWN switch 3 is connected to the ground terminal 1*b* via a driving coil 5*d* of the second relay 5.

The normally-closed contact 32*b* of the second switch 32 and the normally-closed contact 31*b* of the first switch 31 are connected to a body ECU 8 via a remote UP terminal 1*e* and a remote DOWN terminal 1*f*, respectively. The body ECU 8 is an external circuit provided outside of the power window circuit 8. The ECU 8 may be located in the vicinity of a driver's feet in a vehicle compartment.

The body ECU 8 is so designed as to receive an output signal of a power window circuit (PWC) 9 located in a door of the driver's seat. Although not shown in detail, the power window circuit 9 is so constructed in the known manner that it generates not only UP and DOWN output signals for regulating a window of a door for the driver's seat but also output signals for remotely regulating the window of the door for the passenger's seats. The output signals generated by the power window circuit 9 for regulating the window for the passenger's seat are supplied to the power window circuit 1 through signal supply lines connecting the body ECU 8 to the power window circuit 1.

Specifically, an UP signal and a DOWN signal for respectively closing and opening the window on the passenger's seat side are supplied from the power window circuit 9 to the body ECU 8, and further to the remote UP terminal 1*e* and the remote DOWN terminal 1*f* via the body ECU 8. These UP signal and DOWN signal are generated in response to a driver's manual operation of switches 92 and 93 provided near the driver's seat for remotely regulating the window near the passenger's seat. The signal supply line connecting the body ECU 8 and the remote UP terminal 1*e* is for supplying the UP signal, and the signal supply line connecting the body ECU 8 and the remote DOWN terminal 1*f* is for supplying the DOWN signal.

This embodiment operates as follows.

[When a Car is Not Submerged in Water]

When the DOWN switch 3 of the power window circuit 1 is turned on by a passenger, the normally-open contact 31*a* and the movable contact 31*c* of the first switch 31 are connected, and the normally-open contact 32*a* and the movable contact 32*c* of the second switch 32 are also connected. The electric current flows through the route of the power source terminal 1*a*→the diode 6→the normally-open contact 31*a* and the movable contact 31*c* of the first switch 31→the driving coil 5*d* of the second relay 5, thereby connecting the normally-open contact 5*a* and the movable contact 5*c* of the second relay 5 by the driving coil 5*d*. The electric current flows through the route of the power source terminal 1*a*→the normally-open contact 5*a* and the movable contact 5*c* of the second relay 5→the motor 7→the movable contact 4*c* and the normally-closed contact 4*b* of the first relay 4, thus driving the motor 7 in one direction to lower or open the window from the passenger's seat.

When the UP switch 2 is turned on, the normally-open contact 2*a* and the movable contact 2*c* of the UP switch 2 are connected. The electric current flows through the route of the power source terminal 1*a*→the diode 6→the UP switch 2→the driving coil 4*d* of the first relay 4, thus connecting the normally-open contact 4*a* and the movable contact 4*c* of the first relay 4 by the driving coil 4*d*. Thus the electric current flows through the route of the power source terminal 1*a*→the normally-open contact 4 and the movable contact 4*c* of the first relay 4→the motor 7→the movable contact 5*c* and the normally-closed contact 5*b* of the second relay 5, thereby driving the motor 7 in the other direction. The window is raised or closed by thus operating the UP switch 2 at the passenger's seat.

When the DOWN switch 93 provided in the power window circuit 9 is turned on, the DOWN signal is inputted into the remote DOWN terminal 1*f* of the power window circuit 1 through the body ECU 8. The electric current flows through the route of the remote DOWN terminal 1*f*→the normally-closed contact 31*b* and the movable contact 31*c* of the first switch 31→the driving coil 5*d* of the second relay 5, thereby connecting the normally-open contact 5*a* and the movable contact 5*c* of the second relay 5 by the driving coil 5*d*. Therefore, the current flows through the route of the power source terminal 1*a*→the normally-open contact 5*a* and the movable contact 5*c* of the second relay 5→the motor 7→the movable contact 4*c* and the normally-closed contact 4*b* of the first relay 4, driving the motor 7 in a direction to open the window. The window is thus lowered by manually operating the DOWN switch 93 from the driver's seat.

When the UP switch 92 in the power window circuit 9 located in the vicinity of the driver's seat is turned on, the UP signal is supplied to the remote UP terminal 1*e* of the power window circuit 1 through the body ECU 8. The electric current flows through the remote UP terminal 1*e*→the normally-closed contact 32*b* and the movable contact 32*c* of the second switch 32→the normally-closed contact 2*b* and the movable contact 32*c* of the second switch 32→the driving coil 4*d* of the first relay 4, thereby connecting the normally-open contact 4*a* and the movable contact 4*c* of the first relay 4 by the driving coil 4*d*. The electric current flows through the route of the power source terminal 1*a*→the normally-open contact 4*a* and the movable contact 4*c* of the first relay 4→the motor 7→the movable contact 5*c* and normally-closed contact 5*b* of the second relay 5, thus driving the motor 7 in the direction to close the window. The window is raised by thus operating the UP switch 92 from the driver's seat.

[When a Car is Submerged in Water]

In the event of submersion of a car in water, the driver will lower to open the door window for the purpose of getting out of the car. In this case, the DOWN switch 3 is turned on. Then, the normally-open contact 31*a* and the movable contact 31*c* of the first switch 31 are connected and also the normally-open contact 32*a* and the movable contact 32*c* of the second switch 32 are connected, thus performing the same window opening operation as when the car is not submerged in water.

At this time, the line connecting the body ECU 8 and the remote UP terminal 1*e* or the remote DOWN terminal 1*f* is sometimes at a +B potential or grounded by a leakage of current caused by water.

Therefore, where the power window device has such a circuit constitution that the power supply line to which the voltage is applied for driving the window is connected to the UP and DOWN signal supply line through which, upon turning on the DOWN switch 3, the DOWN signal is inputted via the body ECU 8 from the driver's seat, a great current flows through the signal supply line, failing to lower the window. Furthermore, the flow of the great current will sometimes damages the surge-protective diode 6 and melt a fuse (not shown) inserted in the power supply line.

However, according to the present embodiment, when the DOWN switch 3 is turned on, the signal supply line from the body ECU 8 can be disconnected from the power supply line, to thereby reliably lower the window and prevent burning of the surge-protective diode 6.

The power window device according to this invention can reliably lower the window for the passenger's seat by turning on the DOWN switch 3 located in the vicinity of the passenger's seat in the event the car is submerged in water.

The same advantage as described above is attained in case of biting of wiring of the power window device.

For example, the body ECU 8 and the power window circuit 1 routed in the door for each seat are connected by a wiring harness. Accordingly it becomes necessary to install the wiring harness through a door hinge. In this case, however, there is such a likelihood as the biting of the wiring harness by the door, resulting in spalling of the covering of the wiring harness and in grounding at the spalled portion of the harness. In this case also, the line connecting the body ECU 8 and the remote UP terminal 1_e_ or the remote DOWN terminal 1_f_ will be grounded like in case the car is submerged in water. However, it is possible to attain the same advantage as described above, because the signal line from the body ECU 8 can be disconnected from the power supply line when the DOWN switch 3 is turned on.

Although the first and the second relays 4 and 5 are driven by means of the driving coils 4_d_ and 5_d_ in the above embodiment, semiconductor switching devices (e.g., MOS transistors) may be used therefor.

It will be understood that the circuit constitution is not limited to that of the above embodiment, and may be other circuit constitution as long as the signal supply line from the body ECU 8 can be disconnected from the power supply line when the DOWN switch 3 is turned on.

What is claimed is:

1. A power window device comprising:

a power window circuit having an UP switch and a DOWN switch for closing and opening a door window, respectively;

a power supply line for supplying a power supply voltage to the power window circuit;

an external circuit arranged outside of the power window circuit for generating an UP signal for closing the window and a DOWN signal for opening the window to the power window circuit; and a signal supply line connecting the external circuit to the power window circuit for applying the UP signal and the DOWN signal from the external circuit to the power window circuit, wherein the power window circuit and the external circuit are arranged to electrically disconnect the signal supply line from the power supply line to open the door window when the DOWN switch of the power window circuit is turned on.

2. The power window device as in claim 1, wherein:

the power window circuit is located near a passenger's seat other than a driver's seat for opening and closing the door window near the passenger's seat;

the external circuit is located near the driver's seat for regulating a door window near the driver's seat and generating the UP signal and the DOWN signal which are supplied to the power window circuit for the door window near the passenger's seat.

3. The power window device as in claim 1, wherein:

the DOWN switch has a first switch and a second switch which are mutually interlocked;

the signal supply line has an UP signal line for supplying the UP signal, and a DOWN signal line for supplying the DOWN signal;

the first switch has a normally-closed contact to which the DOWN signal line is connected;

the second switch has a normally-closed contact to which the UP signal line is connected; and the normally-closed contacts connected with the UP signal line and the DOWN signal line are electrically disconnected from movable contacts of the first and second switches, when the DOWN switch is turned on.

4. The power window device as in claim 3, wherein:

the power window circuit has a power supply terminal to which the power supply voltage is applied, a first switching device and a second switching device;

a normally-open contact of the UP switch and a normally-open contact of the first switch are connected to the power supply terminal;

the normally-open contact and the movable contact of the UP switch are electrically connected to supply the power supply voltage to the first switching device when the UP switch is turned on; and the normally-open contact and the movable contact of the first switch are electrically connected to supply the power supply voltage to the second switching device when the UP switch is turned on.

5. The power window device as in claim 4, wherein:

the first and the second switching devices are in a double-throw switch type and have respective normally-open contacts connected to the power supply terminal;

a motor for driving the door window is connected between movable contacts of the first and the second switching devices.

6. The power window device as in claim 5, wherein:

the normally-closed contacts of the first and the second switching devices are grounded.

7. The power window device as in claim 6, wherein:

the normally-closed contact of the UP switch and the movable contact of the second switch are electrically connected.

8. The power window device as in claim 7, wherein:

the normally-open contact and the movable contact of the first switching device are electrically connected when the UP signal is supplied to the first switching device through the second switch and the UP switch, thereby applying the power supply voltage to the motor through the first switching device.

9. The power window device as in claim 7, wherein:

the normally-open contact and the movable contact of the second switching device are electrically connected when the DOWN signal is supplied to the second switching device through the first switch, thereby applying the power supply voltage to the motor through the second switching device.

10. The power window device as in claim 1 further comprising:

a motor for driving the door window; and first and second relays having respective driving coils, wherein the DOWN switch includes a first switch and a second switch which are mutually interlocked, wherein the signal supply line includes an UP signal line and a DOWN signal line to the power window circuit, respectively, wherein a normally-open contact (2_a_) of the UP switch, a normally-open contact of the first switch, a normally-open contact of the first relay, and a normally-open contact of the second relay are connected to a power supply terminal of the power window circuit, wherein a movable contact of the UP switch is connected to the driving coil of the first relay, and a movable contact of the first switch is connected to the driving coil of the second relay, wherein a normally-closed contact of the UP switch is connected to a movable contact of the second switch, wherein the UP signal line is connected to a normally-closed contact of the second switch, and the DOWN signal line is connected to a normally-closed contact of the first switch, and wherein the motor is connected between a movable contact of the first relay and a movable contact of the second relay.

11. A power window device comprising:

a power window circuit having an UP switch and a DOWN switch for closing and opening a door window, respectively;

a motor for driving the door window up and down;

a power supply line for supplying a power supply voltage to the motor;

an external circuit arranged outside of the power window circuit for generating an UP signal for closing the window and a DOWN signal for opening the window to the power window circuit; and a signal supply line connecting the external circuit to the power window circuit for applying the UP signal and the DOWN signal from the external circuit to the power window circuit, wherein the power window circuit and the external circuit are arranged to electrically disconnect the signal supply line from the power supply line to open the door window when the DOWN switch of the power window circuit is turned on.

* * * * *